US009306876B1

(12) United States Patent
Ulman et al.

(10) Patent No.: US 9,306,876 B1
(45) Date of Patent: Apr. 5, 2016

(54) MULTIBANK EGRESS QUEUING SYSTEM IN A NETWORK DEVICE

(71) Applicant: Marvell Israel (M.I.S.L) Ltd., Yokneam (IL)

(72) Inventors: Sharon Ulman, Yehoshua (IL); Roi Sherman, Yokneam (IL); Dror Bromberg, Michmoret (IL); Carmi Arad, Nofit (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 177 days.

(21) Appl. No.: 14/242,321

(22) Filed: Apr. 1, 2014

Related U.S. Application Data

(60) Provisional application No. 61/807,097, filed on Apr. 1, 2013.

(51) Int. Cl.
| H04L 12/28 | (2006.01) |
| H04L 12/56 | (2006.01) |
| H04L 12/861 | (2013.01) |
| G06F 12/02 | (2006.01) |
| H04L 12/879 | (2013.01) |

(52) U.S. Cl.
CPC ............ H04L 49/90 (2013.01); G06F 12/0246 (2013.01); H04L 49/901 (2013.01)

(58) Field of Classification Search
CPC ..... H04L 47/50; H04L 9/0869; H04L 9/0662; H04L 12/18; G06F 7/582; G06F 7/58; G06F 7/588
USPC .................. 711/103, 163; 370/412, 416, 390
See application file for complete search history.

(56) References Cited

U.S. PATENT DOCUMENTS

| 5,744,668 | A | 4/1998 | Zhou et al. |
| 5,901,139 | A | 5/1999 | Shinohara |
| 5,951,694 | A | 9/1999 | Choquier et al. |
| 6,034,945 | A | 3/2000 | Hughes et al. |
| 6,377,546 | B1 | 4/2002 | Guerin et al. |
| 6,504,818 | B1 | 1/2003 | Levine |
| 6,625,159 | B1 | 9/2003 | Singh et al. |
| 7,023,840 | B2 | 4/2006 | Golla et al. |
| 7,075,927 | B2 | 7/2006 | Mo et al. |
| 7,245,586 | B2 | 7/2007 | Bitar et al. |

(Continued)

OTHER PUBLICATIONS

Arad, Carmi, et al., "Enhanced Tail Dropping in a Switch," U.S. Appl. No. 13/022,303, filed Feb. 7, 2011.

(Continued)

Primary Examiner — Andrew Chriss
Assistant Examiner — Romani Ohri

(57) ABSTRACT

In a method of managing queues in an egress queuing system in a network device, a plurality of packets to be stored in a first egress queue are received. The first egress queue is distributed among a plurality of memory banks. The packets are distributed among the plurality of memory banks. Memory banks in which to store the packets are selected based on pseudorandom numbers generated for the packets. The pseudorandom numbers are generated using a first pseudorandom number generator initialized with a first seed. Subsequently, the packets are retrieved from the plurality of memory banks. Memory banks from which to retrieve the packets are selected based on pseudorandom numbers regenerated for the packets. The pseudorandom numbers are regenerated using a second pseudorandom number generator initialized with the first seed.

21 Claims, 4 Drawing Sheets

(56) References Cited

U.S. PATENT DOCUMENTS

| | | | |
|---|---|---|---|
| 7,286,485 B1 | 10/2007 | Ouellette et al. | |
| 7,295,564 B2 | 11/2007 | Ling et al. | |
| 7,397,809 B2 | 7/2008 | Wang | |
| 7,443,790 B2 | 10/2008 | Aicklen et al. | |
| 7,463,630 B2 | 12/2008 | Lee | |
| 7,486,689 B1 | 2/2009 | Mott | |
| 7,602,720 B2 | 10/2009 | Bergamasco et al. | |
| 7,710,969 B2 | 5/2010 | Szczepanek et al. | |
| 7,756,991 B2 | 7/2010 | Chen et al. | |
| 7,802,028 B2 | 9/2010 | Andersen et al. | |
| 7,948,976 B2 | 5/2011 | Arad et al. | |
| 8,149,708 B2 | 4/2012 | Oz et al. | |
| 8,218,546 B2 | 7/2012 | Opsasnick | |
| 8,422,508 B2 | 4/2013 | Beshai | |
| 8,725,873 B1 | 5/2014 | Bromberg | |
| 8,930,712 B1 * | 1/2015 | Chou | H04L 63/0428 380/46 |
| 8,948,193 B2 | 2/2015 | Perlmutter et al. | |
| 2003/0223442 A1 | 12/2003 | Huang et al. | |
| 2004/0003173 A1 * | 1/2004 | Yao | G06F 3/061 711/114 |
| 2006/0212778 A1 * | 9/2006 | Wheeler | G06F 11/106 714/764 |
| 2006/0294331 A1 * | 12/2006 | Forrer | G06F 12/1466 711/163 |
| 2008/0215798 A1 * | 9/2008 | Sharon | G11C 11/5628 711/103 |
| 2008/0263117 A1 * | 10/2008 | Rose | G06F 7/582 708/254 |
| 2014/0068149 A1 * | 3/2014 | Kanamori | G06F 12/0246 711/103 |

OTHER PUBLICATIONS

Ulman, Sharon, et al, "Scalable Multi-Client Scheduling," U.S. Appl. No. 14/242,338, filed Apr. 1, 2014.

* cited by examiner

MULTIBANK EGRESS QUEUING SYSTEM IN A NETWORK DEVICE

CROSS-REFERENCE TO RELATED APPLICATION

This disclosure claims the benefit of U.S. Provisional Patent Application No. 61/807,097, filed Apr. 1, 2013, entitled "Scalable multibank output queuing system," the disclosure of which is hereby expressly incorporated herein by reference in its entirety.

The present application is related to U.S. patent application Ser. No. 14/242,338, entitled "Scalable Multi-Client Scheduling" and filed on the same day as the present application, the disclosure of which is hereby incorporated herein by reference in its entirety.

FIELD OF THE DISCLOSURE

The present disclosure relates generally to network devices and, more particularly, to egress queuing systems in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional egress queuing systems are typically configured so that a single packet can be enqueued in any particular queue in a given clock cycle. In the context of some networking or switching applications, an egress queuing system is shared by multiple packet processing cores of a network device. These multiple devices and cores together offer the ability to switch among a large number of ports. However, in such devices, multiple processing cores may need to simultaneously enqueue packets in a particular egress queue.

Some attempts have been made to design egress queuing systems that allow multiple packets to be enqueued in a single egress queue in a given clock cycle. For example, egress queues can be stored in a memory device that runs on a faster clock relative to a clock used by packet processing cores, allowing multiple packets to be written to a same queue in a single clock cycle of the packet processing cores. Additionally or alternatively, a width of a memory device can be increased to allow more packets to be written to a same queue in a single clock cycle of the memory device. Such methods, however, are limited with respect to the maximum number of packets that can be written to a same queue in a given clock cycle. Further, such methods are not readily scalable to support larger numbers of egress queues and/or larger numbers of packet processing cores in a network device.

SUMMARY

In an embodiment, a method of managing queues in an egress queuing system in a network device comprises receiving a plurality of packets to be stored in a first egress queue, wherein the first egress queue is distributed among a plurality of memory banks. The method also comprises distributing the packets among the plurality of memory banks, including selecting memory banks in which to store the packets based on pseudorandom numbers generated for the packets, wherein the pseudorandom numbers are generated using a first pseudorandom number generator initialized with a first seed. The method additionally comprises subsequently retrieving the packets from the plurality of memory banks, including selecting memory banks from which to retrieve the packets based on pseudorandom numbers regenerated for the packets, wherein the pseudorandom numbers are regenerated using a second pseudorandom number generator initialized with the first seed.

In another embodiment, an egress queuing system comprises a plurality of memory banks for storing egress queues, wherein each egress queue is distributed among two or more memory banks of the plurality of memory banks. The egress queuing system also comprises a write controller coupled to the plurality of memory banks, the write controller configured to receive a plurality of packets to be stored in a first egress queue, and distribute the packets among the plurality of memory banks configured to store the first queue, wherein the write controller is configured to select memory banks in which to store the packets based on pseudorandom numbers generated for the packets, wherein the pseudorandom numbers are generated using a first pseudorandom number generator initialized with a first seed. The egress queuing system further comprises a read controller coupled to the plurality of memory banks, the read controller configured to retrieve the packets from the plurality of memory banks configured to store the first queue, wherein the read controller is configured to select memory banks from which to retrieve the packets based on pseudorandom numbers regenerated for the packets, wherein the pseudorandom numbers are regenerated using a second pseudorandom number generator initialized with the first seed.

In still another embodiment, a network device comprises one or more packet processing cores configured to receive packets from a network and to transmit packets on a network. The network device also comprises an egress queuing system coupled to the one or more packet processing cores. The egress queuing system is configured to receive, from one or more packet processing cores, a plurality of packets to be stored in a first egress queue, wherein the first queue is distributed among a plurality of memory banks. The queuing system is further configured to distribute the packets among the plurality of memory banks, wherein the queuing system is configured to select memory banks in which to store the packets based on pseudorandom numbers generated for the packets, wherein the pseudorandom numbers are generated using a first pseudorandom number generator initialized with a first seed. The queuing system is additionally configured to subsequently retrieve the packets from the plurality of memory banks, wherein the egress queuing system is configured to select memory banks from which to retrieve the packets based on pseudorandom numbers regenerated for the packets, wherein the pseudorandom numbers are regenerated using a second pseudorandom number generator initialized with the first seed.

DETAILED DESCRIPTION

Figure 1:
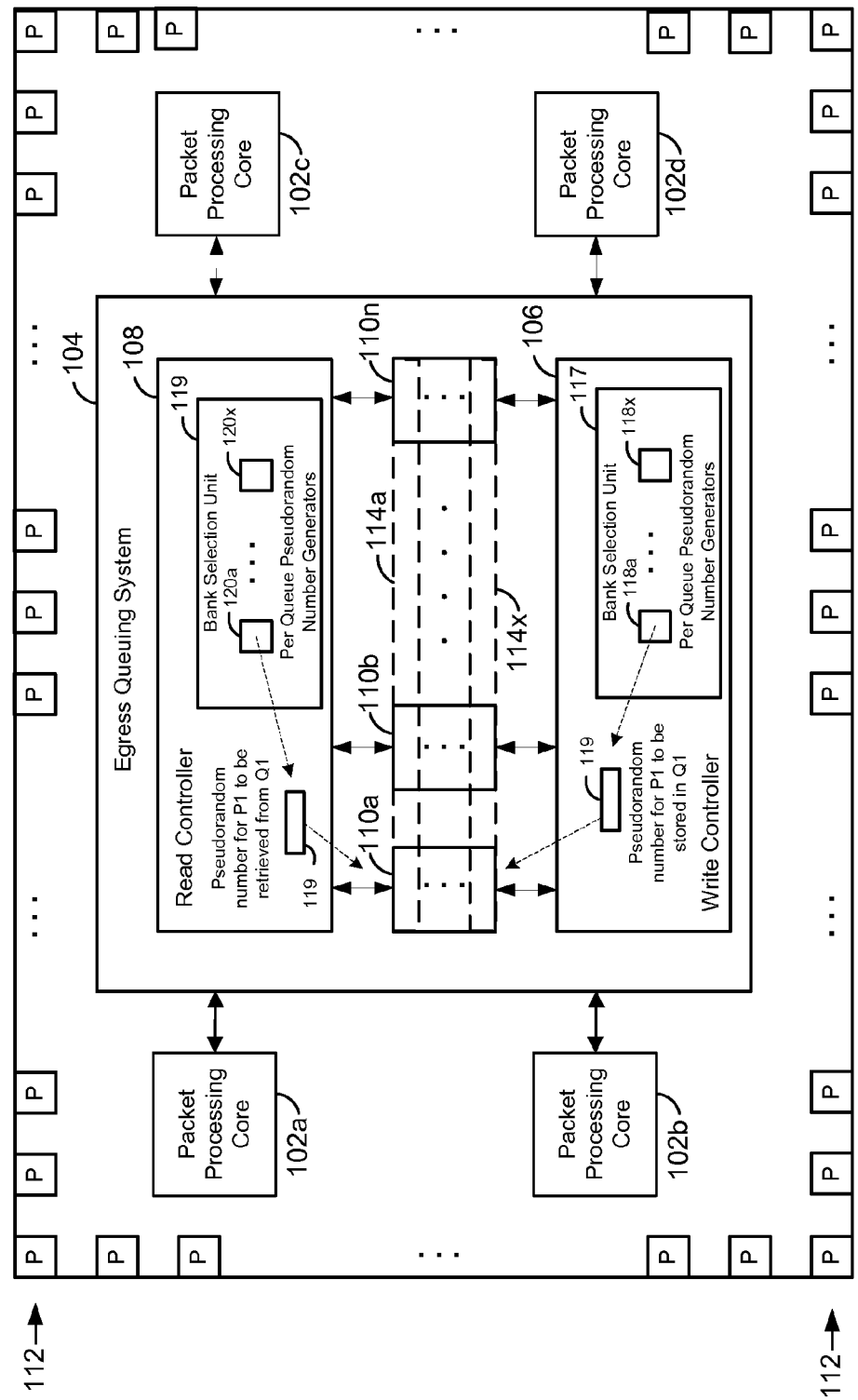
FIG. 1 is a block diagram of an example multi-core network device, such as a Layer-2 and/or Layer-3 switch, according to an embodiment.

FIG. 1 is a block diagram of an example multi-core network device 100, such as a Layer-2 and/or Layer-3 switch, according to an embodiment. The network device 100 includes a plurality of packet processing cores 102 coupled to an egress queuing system 104 shared by the packet processing cores 102. Although four packet processing cores are illustrated in FIG. 1, the network device 100 includes other suitable numbers of packet processing cores 102, and the egress queuing system 104 is shared by the other suitable number of packet processing cores 102, in other embodiments. For example, in an example embodiment in which the packet processing cores 102 are implemented using custom integrated circuits (ICs), such as application specific integrated circuits (ASICs), configured to process packets using multiple packet processing stages arranged in a pipeline architecture, the network device 100 includes 8 or 16 packet processing cores 102. As another example, in example embodiments in which the packet processing cores 102 process packets using software instructions stored in a memory (not shown in FIG. 1), wherein each packet processing core 102 is configured to perform all necessary processing (run to completion processing) of a packet, the network device 100 typically includes greater numbers of packet processing cores 102, such as hundreds of packet processing cores 102. In some such embodiments, the packet processing cores 102 are arranged in clusters, in the egress queuing system 104 is shared by the clusters of the packet processing cores 102. The network device 100 also includes a plurality of ports 112, and each port 112 is coupled to a respective communication link associated with a communication network and/or to a network device operating within a communication network. The packet processing cores 102 are configured to process packets received via the ports 112 and to determine respective ports 112 via which the packets should be subsequently transmitted, in an embodiment.

In some embodiments, the packet processing cores 102 processes packet descriptors corresponding to the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of the source port 112 via which the packet was received by the network device 100, an indicator of where the packet is stored in a memory associated with the network device 100, etc. For ease of explanation, the term "packet" herein is used to refer to a packet itself or to a packet descriptor associated with the packet.

The egress queuing system 104 includes a write controller 106, a read controller 108, and a plurality of memory banks 110. The egress queuing system 104 is configured to maintain a plurality of egress queues 114 in the memory banks 110. Each egress queue 114 is associated with an egress port 112 and is used to queue packets to be subsequently transmitted via the egress port 112, in an embodiment. In an embodiment, multiple egress queues 114 are associated with an egress port 112, wherein each of the multiple queues 114 corresponds to a different priority. In an embodiment, the packet processing cores 102 determine egress queues 114 into which packets should be placed and provide the packets, along with indications of the queues 114 into which to place the packets, to the egress queuing system 104. The egress queuing system 104 receives the packets and enqueues the packets in the egress queues 114 determined for the packets by the packet processing cores 102. Subsequently, the egress queuing system 104 retrieves the packets from the egress queues 114 and provides the packets to the packet processing cores 102 that are to transmit the packets, in an embodiment.

Because the packet processing cores 102 process packets in parallel, multiple ones of the packet processing cores 102 at least substantially simultaneously provide respective packets to the egress queuing system 104, in at least some embodiments and scenarios. Moreover, multiple ones of the packets that are at least substantially simultaneously provided to the egress queuing system 104 are directed to a same egress queue 114, in some embodiments and scenarios.

In an embodiment, each of the egress queues 114 is distributed among the memory banks 110. Because the queues 114 are distributed among memory banks 110, the queuing system 104 is able to enqueue multiple packets in the memory banks 110 in parallel (e.g., in a single clock cycle) by writing each of the multiple packets in a different one of the memory banks 110, in an embodiment. Further, because each egress queue 114 is distributed among multiple memory banks 110, the queuing system 104 is able to enqueue, in parallel (e.g., in a single clock cycle), multiple packets directed to a same egress queue 114 in the memory banks 110 by writing the multiple packets directed to the same egress queue 114 to multiple ones of the memory banks 110, in an embodiment.

In an embodiment, the write controller 110 is configured to distribute packets received by the queuing system 104 among the memory banks 110 by selecting different memory banks 110 for storing sequentially received packets directed to a queue 114. In an embodiment, the write controller 104 selects a memory bank 110 in which to store a packet based on a pseudorandom number generated for the packet. The read controller 108 subsequently retrieves the packets from the memory banks 110, in an embodiment. When the read controller 108 is to retrieve a packet from the memory banks 110, the read controller 108 regenerates the pseudorandom number for the packet and selects a memory bank 110 from which to retrieve the packet based on the pseudorandom number regenerated for the packet. As a result, memory banks 106 for retrieving packets stored in a particular queue in the memory banks 110 are selected in the same order as when the packets are written to the particular queue 114 in the memory banks 106, and the order of packets is maintained within the queue 114 as the packets are retrieved from the queue 114, as will be explained in more detail below, in an embodiment.

In an embodiment, the write controller 106 includes a bank selection unit 117 having a plurality of pseudorandom number generators 118, each pseudorandom number generator 118 associated with a particular egress queue 114. The write controller 106 utilizes the pseudorandom number generators 118 to distribute packets directed to particular queues 114 among the plurality of memory banks 110. In particular, the write controller 106 engages a pseudorandom number generator 118 associated with a queue 114 to generate a pseudorandom number each time the write controller 106 is to store a packet directed to the queue 114, in an embodiment. The write controller 106 then selects a memory bank 110 in which to store the packet based on the pseudorandom number generated for the packet.

In an embodiment, each pseudorandom number generator 118 is initialized with a different seed state (or simply "seed"). In an embodiment, the pseudorandom number generators 118 utilize a same generator polynomial, each initialized with a different seed. Using pseudorandom number generators initialized with different seeds to select memory banks for storing packets directed to different egress queues 114 allows the write controller to distribute packets directed to the different queues 114 among the memory banks 110 in a load-balanced manner, resulting in overall balanced distribution of packets in the memory banks 110, in at least some embodiments. Balanced distribution of packets among the memory banks 110 generally improves memory utilization of the memory banks 110, in an embodiment. Balanced distribution of packets directed to the different queues 114 among the memory banks 110 also makes the memory space available in the memory banks 110 to be efficiently shared by all of the queues 114, in an embodiment.

The read controller 108 includes a bank selection unit 119 having a plurality of pseudorandom number generators 120 corresponding to the plurality of pseudorandom number generators 118 of the bank selection unit 117 of the write controller 106, in an embodiment. Each of the pseudorandom number generator 120 is associated with a queue 114 and corresponds to the pseudorandom polynomial 118 associated with the queue 114 at the write controller 106, in an embodiment. In an embodiment, a pseudorandom number generator associated with a queue 114 is initialized with a same seed state as the corresponding pseudorandom number generator 118 associated with the queue 114 at the write controller 118. The read controller 108 engages a pseudorandom number generator 120 associated with a queue 114 to generate a pseudorandom number each time the read controller 108 is to retrieve a packet from the queue 114, in an embodiment. The read controller 108 then selects a memory bank 110 from which to retrieve a packet based on the pseudorandom number generated for the packet by the pseudorandom number generator 120. Because the pseudorandom number generator 118 used for selecting memory banks 110 in which to store packets in a queue 114 and the pseudorandom number generator 120 used for selecting memory banks 110 from which to retrieve packets stored in the queue 114 are initialized with a same seed, the order in which the memory banks 110 are selected for storing the packets is the same as the order in which the memory banks 110 are selected for retrieving the packets from the queue 114, in an embodiment.

In at least some embodiments, using pseudorandom number generators 118 to distribute packets among the memory banks 110 makes the egress queuing system 104 easily scalable to support larger numbers of queues 114 and/or larger numbers of memory banks 110 used for storing the queues 114. For example, to increase the number of queues 114 supported by the egress queuing system 104 by a certain number of queues, a corresponding number of additional pseudorandom number generators are added to the bank selection unit 117, in an embodiment. Additionally or alternatively, to support a greater number of memory banks 110 in the egress queuing system 104, each pseudorandom number generator 118 is reconfigured to distribute packets among the greater number of memory banks 110, in an embodiment. Of course, corresponding changes are made in the bank selection unit 119 if the read controller 108, in such embodiments.

In an embodiment, packets directed to a same egress queue 114 that are stored in a particular memory bank 110 are stored in a local queue, such as a first in first out (FIFO) queue or a linked list queue, corresponding to the queue 114 within the memory bank 110. When the write controller 106 selects a memory bank 110 in which to store a packet directed to a queue 114, the write controller 106 writes the packet to a tail of the local queue corresponding to the queue 114 in the selected memory bank 110, in an embodiment. Then, when the read controller 108 regenerates the pseudorandom number corresponding to the packet and selects a memory bank 110 from which to retrieve the packet, the read controller 108 retrieves packets from a head of the local queue corresponding to the queue 114 in the memory bank 110 selected for retrieving the packet, in an embodiment. Because the order in which memory banks are selected for storing packets directed to a queue 114 is the same as the order at which memory banks are selected for retrieving packets from the queue 114, and because the order of packets in the queue 114 in each of the memory banks is locally maintained within the memory banks, the overall order of the packets within the queue 114 is preserved when the packets are retrieved from the queue 114, in an embodiment.

As an example, in the embodiment of FIG. 1, the write controller 106 includes a first pseudorandom number generator associated with a queue Q1 (e.g., the queue 114a). Q1 is distributed among the plurality of memory banks 110, in an embodiment. The write controller 106 utilizes the pseudorandom number generator 118a to distribute packets directed to Q1 among the plurality of memory banks 110, in an embodiment. In an embodiment, the write controller 106 engages the pseudorandom number generator 118a each time the write controller 106 is to store a packet in Q1, and selects a memory bank 110, among the plurality of memory banks 110, in which to store the packet based on the pseudorandom number generated for the packet by the pseudorandom number generator 118a. The write controller 106 then writes each packet to a tail of a local queue corresponding to Q1 in the memory bank 110 selected for storing the packet. For example, the pseudorandom number generator 118a generates a pseudorandom number 119 for a packet P1 to be stored in the Q1. The pseudorandom number 119 corresponds to the memory bank 110a, in an embodiment. Accordingly, the write controller 106 selects the memory bank 110a for storing the packet P1, and writes the packet to the tail of the local queue corresponding to Q1 in the memory bank 110a, in an embodiment.

The read controller 108 includes a second pseudorandom number generator 120a associated with Q1. The pseudorandom number generator 120a corresponds to the pseudorandom number generator 118a in the write controller 106, in an embodiment. In an embodiment, the pseudorandom number generator 120a is initialized in a same seed state as the pseudorandom number generator 118a in the write controller 106. The read controller 108 utilizes the pseudorandom number generator 120a to select memory banks 110 from which to retrieved packets stored in Q1, in an embodiment. In an embodiment, the read controller 108 engages the pseudorandom number generator 120a each time the read controller 106 is to retrieve a packet from Q1, and selects a memory bank 110, among the plurality of memory banks 110, from which to retrieve the packet based on the pseudorandom number generated for the packet by the pseudorandom number generator 120a. The read controller 108 then retrieves each packet from the head of the local queue corresponding to Q1 in the memory bank 110 selected for retrieving the packet. In the example embodiment illustrated in FIG. 1, when the packet P1 is to be retrieved from Q1, the read controller 108 engages the pseudorandom number generator 120a to generate a pseudorandom number for the packet P1. The pseudorandom number generator 120a regenerates the pseudorandom number 119 generated for the packet P1 by the pseudorandom number generator 118a, in an embodiment. Accordingly, the read controller 108 selects the memory bank 110a for retrieving the packet P1, in this embodiment. When the packet P1 is to be retrieved from Q1, packet P1 is at the head of the local queue corresponding to Q1 in the memory bank 110a, and the read controller 106 retrieves the packet P1 from the memory bank 110a, in an embodiment.

Because the pseudorandom number generator 120a is initialized with a same state seed state as the pseudorandom number generator 118a, when the pseudorandom number generator 120a is engaged to generate a pseudorandom number of a packet associated with Q1, the pseudorandom number generator 120a regenerates the same pseudorandom number 119 when the read controller 108 is to retrieve the packet from Q1. As a result, the memory bank 110 selected for retrieving the packet from Q1 by the read controller 108 is the same memory bank 110 that was selected for storing the packet in Q1 by the write controller 106, in an embodiment. As discussed above, order of packets in Q1 in a particular memory 110 is maintained in a local queue corresponding to Q1 in the particular memory bank 110, in an embodiment. Further, order of packets in Q1 stored in different memory banks 110 is maintained by selecting, for retrieving each packet from Q1, the same memory bank 110 as the memory bank that was selected for storing the packet in Q1, in an embodiment.

As discussed above, using pseudorandom numbers to distribute packets directed to the queues 114 among the memory banks 110 generally ensures a balanced distribution of the packets among the memory banks 110, in at least some embodiments. In other words, because each pseudorandom number generator 118 effectively randomly distributes packets directed to a particular queue 114 among the memory banks 110, the packets directed to the particular queue 114 are distributed in a balanced manner (e.g., evenly) among the memory banks 110, in an embodiment. Further, initializing each pseudorandom number generator 118 with a different seed state results in load balanced distribution of packets directed to different queue 114 among the plurality of memory banks, in at least some embodiments. Further still, because a pseudorandom number generators 118 associated with a queue 114 generates a deterministic (i.e. reproducible) sequence of pseudorandom numbers used for selecting memory banks 110 in which to store packets directed to the queue 114, using a corresponding pseudorandom number generator 120 to select memory banks 110 from which to retrieve the packets ensures that the order of packets is maintained within the queue 114 as the packets are retrieved from the queue 114, in an embodiment.

Moreover, because each memory bank 110 independently maintains order of packets in a local queue correspond to the queue 114 in the memory bank 110, the queuing system 104 is easily scalable to support any suitable number of memory banks 110 and/or any suitable number of queues 114 distributed among the memory banks 110, if desired. For example, the egress queuing system 104 can easily be expanded to support more packet processing cores 102 and/or to support more queues 114 by increasing the number of memory banks 110 and distributing each of the queues 114 among the increased number of memory banks, in an embodiment. A larger number of memory banks can allow the queuing system 104 to enqueue and dequeue packets at received at higher rates (e.g., due to increased number of packet processing cores in the network device 100), in at least some embodiments. Generally speaking, the egress queuing system 104 is capable of storing packets at a rate of X*N, wherein X is the bandwidth of each memory bank 110 and N is the number of memory banks 110 in the egress queuing system 104, in an embodiment. Thus, generally speaking, any desired rate can be achieved in the egress queuing system 104 by selecting an appropriate number of memory banks 110 needed for the desired rate to be supported by egress queuing system 104, in various embodiments. Also, increased number of memory banks 110 can allow the queuing system 104 to better resolve collisions and/or avoid situations, in which a same memory bank is selected for storing multiple simultaneously received packets, as will be explained in more detail below, in at least some embodiments.

Figure 2:
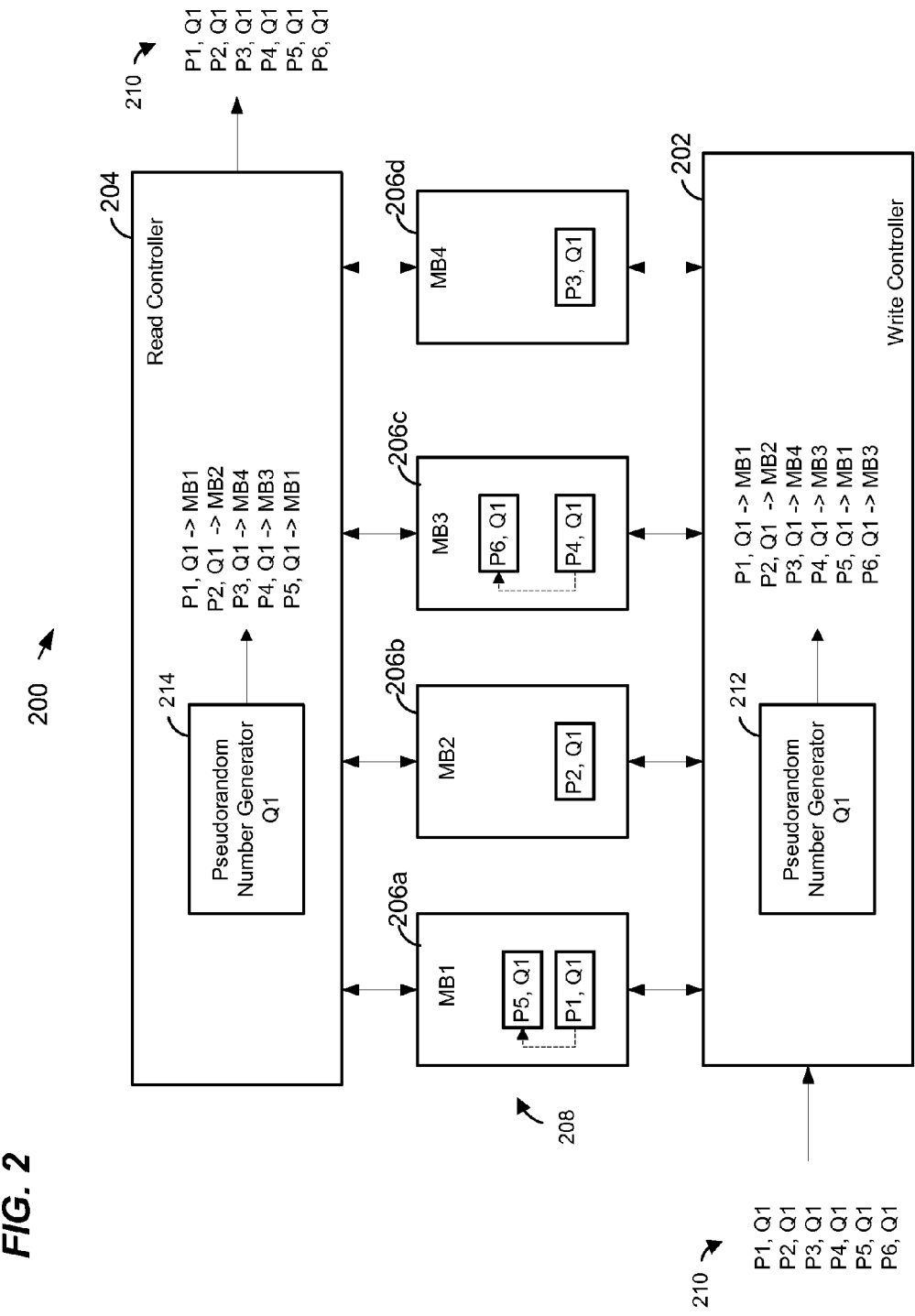
FIG. 2 is a block diagram of a egress queuing system that can be used in the network device of FIG. 1, according to an embodiment.

FIG. 2 is a block diagram of a egress queuing system 200, according to an embodiment. The egress queuing system 200 includes a write controller 202, a read controller 204 and a plurality of memory banks 206. The memory banks 206 include a plurality of egress queues 208 distributed among the plurality of memory banks 206 as discussed above, in an embodiment. The write controller 202 is configured to distribute packets directed to the queues 208 among the memory banks 206, in an embodiment. The read controller 204 is configured to subsequently retrieve the packets from the queues 208 in the memory banks 206 while maintaining the order of packets within the respective queues 208, in an embodiment. With reference to FIG. 1, the egress queuing system 200 is used as the egress queuing system 104 of the network device 100. In an embodiment, the write controller 202 corresponds to the write controller 106 of FIG. 1, the read controller 204 corresponds to the read controller 108 of FIG. 1 and the memory banks 206 correspond to the memory banks 110 of FIG. 1.

The egress queuing system 200 receives a plurality of packets 210 to be stored in the memory banks 206. For ease of explanation, the packets 210 are all directed to a same queue 208, in the illustrated embodiment. The egress queuing system 200 receives the packets 210 from multiple packet processing cores, such as the packet processing cores 102 of FIG. 1, and the egress queuing system 200 receives at least some of the packets 210 in parallel from respective packet processing cores, in an embodiment.

The packets 210 are provided to the write controller 202. In an embodiment, the write controller 202 distributes the packets 210 among the memory banks 206 by storing sequentially received packets 210 in different ones of the memory banks 206. In an embodiment, the write controller 202 distributes the packets 210 among the memory banks 206 by selecting a memory bank 206 in which to store a packet 210 based on a pseudorandom number generated for the packet 210. Distributing packets associated with a particular queue among the memory banks 206 by selecting memory banks in which to store the packets based on pseudorandom numbers generated for the packets ensures a balanced distribution of the packets among the memory banks 206 and also allows for the order of packets within the queue to be preserved when the packets are dequeued from the queue, as will be explained in more detail below, in an embodiment.

The write controller 202 includes a pseudorandom number generator 212. The pseudorandom number generator 212 is associated with the queue 208 and is used to select memory banks 206 in which to store packets directed to the queue 208. In an embodiment, the pseudorandom number generator 212 is initialized with a seed state (or simply "seed") associated with the queue 208. For example, the pseudorandom number generator 212 implements a generator polynomial initialized with a seed state associated with the queue 208, in an embodiment. The write controller 202 engages the pseudorandom number generator 212 to generate a pseudorandom number for each packet 210 received by the write controller 202, in an embodiment. Having been initialized with the seed state, each time the pseudorandom number generator 212 is engaged to generate a pseudorandom number, the pseudorandom number generator 212 generates the pseudorandom number based on the current state of the pseudorandom number generator 212. Each time a pseudorandom number is generated by the pseudorandom number generator 212, the state of the pseudorandom number generator 212 is advanced to a next state. When the pseudorandom number generator 212 is subsequently engaged to generate a next pseudorandom number, the next pseudorandom number is generated based on the advanced state, in an embodiment.

When the write controller 202 obtains a pseudorandom number generated for a packet 210 by the pseudorandom number generator 212, the write controller 202 selects a memory bank 206 in which to store the packet 210 based on the pseudorandom number generated for the packet 210. Generally speaking, the write controller 202 uses pseudorandom numbers sequentially generated by the pseudorandom number generator 212 for selecting memory banks 206 in which to store sequential packets in the queue 208, in an embodiment. When the write controller 202 receives multiple packets 210 in parallel, the write controller 202 selects memory banks 206 in which to store these packets 210 in round robin manner based on sequentially generated pseudorandom numbers by pseudorandom number generator 212, in an embodiment.

In an embodiment, each of the memory banks 206 maintains a local queue (e.g., a FIFO or a linked list) corresponding to the queue 208 (sometimes referred to herein as "local queue" 208) and used for storing packets directed to the queue 208 that are stored in the memory bank 206, in an embodiment. When a new packet 210 is written to the local queue 208 in a particular memory bank 206, the new packet is written to a tail of the local queue in the memory bank 206. For example, each memory bank 206 includes a head register that stores an indication of a memory location at the head of the local queue 208 in the memory bank 206, a tail register that stores an indication of a memory location at the tail of the local queue 208 in the memory bank 206, and a free buffer list (e.g., A FIFO) of buffers available for allocation in the memory bank 206. When the write controller 202 is to write a packet to the local queue 208 in a particular memory bank 206, the write controller 202 retrieves an indication of the memory location in which to store the packet from the tail register associated the queue 208 in the memory bank 206, and writes the packet to the indicated memory location at the tail of the local queue 208 in the memory bank 206. When a packet is written to the tail of the local queue 208 in the memory bank 206, a buffer for a next packet in the queue is allocated from the list of free buffers available for allocation in the memory bank 206, and the packet being written to the memory bank 206 is further linked to the next packet in the queue 208 that will subsequently be written to the local queue 208. For example, the indication of the memory location allocated for the next packet in the queue 208 is written, along with the current packet, to the memory location in which the current packet is stored in the memory bank 206, in an embodiment. Similarly, when the read controller 204 is to retrieve a packet from a particular memory bank 206, the read controller 204 retrieves an indication of a memory location of the head of the local queue 208 in the memory bank 206 and retrieves the packet from the head of the local queue 208 in the memory bank 206, in an embodiment.

In the embodiment of FIG. 1, the write controller 210 selects the memory bank MB1 (206a) for a first packet P1 based on the pseudorandom number generated for the packet P1 by the pseudorandom number generator 212, the memory bank MB2 (206b) for a second packet P2 based on the pseudorandom number generated for the packet P2 by the pseudorandom number generator 212, the memory bank MB4 (206d) for a third packet P3 based on the pseudorandom number generated for the packet P3 by the PRNG 212, the memory bank MB3 (206c) for a fourth packet P4 based on the pseudorandom number generated for the packet P4 by the pseudorandom number generator 212, the memory bank MB1 (206a) for a fifth packet P5 based on the pseudorandom number generated for the packet P5 by the pseudorandom number generator 212, and the memory bank MB3 (206c) for a sixth packet P6 based on the pseudorandom number generated for the packet P6 by the pseudorandom number generator 212. The write controller 202 writes each of the packets 210 to the tail of the local queue 208 in the memory bank 206 selected for the packet 210. The packet 210 is further linked to a next memory location in the linked list corresponding to the queue 208 in the memory bank 206 (e.g., a next buffer allocated to the linked list corresponding to the queue 208), in an embodiment.

In some embodiments in which the memory banks 206 are configured to store multiple queues 208, the write controller 202 includes multiple pseudorandom number 212, each pseudorandom number 212 associated with a particular queue 208 and used to distribute packets directed to the particular queue 208 among the memory banks 206. In an embodiment, each of the multiple pseudorandom number generators 212 is initialized with a respective seed associated with a particular queue 208. For example, the pseudorandom number generators 212 implement a same generator polynomial, but each of the pseudorandom number generators 212 is initialized with a different seed associated with a particular queue 208, in an embodiment. The write controller 202 engages a pseudorandom number generator 212 associated with a queue 208 to select a memory bank 206 in which to store a packet directed to the queue 208. Similarly, the read controller 204 includes multiple pseudorandom number generators 214 corresponding to the multiple pseudorandom number generators 212 in the write controller 202, in such embodiments. Each pseudorandom number generator 214 is associated with a particular queue 208 and is used to retrieve packets from the particular queue 208. Each of the pseudorandom number generators 214 is initialized with a same seed as the corresponding pseudorandom number generator 212 (i.e., the pseudorandom number generator 212 that is associated with the same queue 208) in the write controller 202. The read controller 202 engages a pseudorandom number generator 214 associated with a queue 208 to select a memory bank 206 from which to retrieve a packet from the queue 208. As such, when retrieving a packet from a queue 208, the read controller 204 regenerates the pseudorandom number that was generated for the packet at the write controller 202, and selects the same memory bank 206 that was selected for the packet at the write controller 204. Accordingly, the read controller 204 retrieves packets from the memory bank 206 in the order in which the packet were written to the memory banks 206, thereby ensuring that the order of packets is maintained within the queue 208 when the packets are retrieved from the queue 208, in an embodiment.

Figure 3:
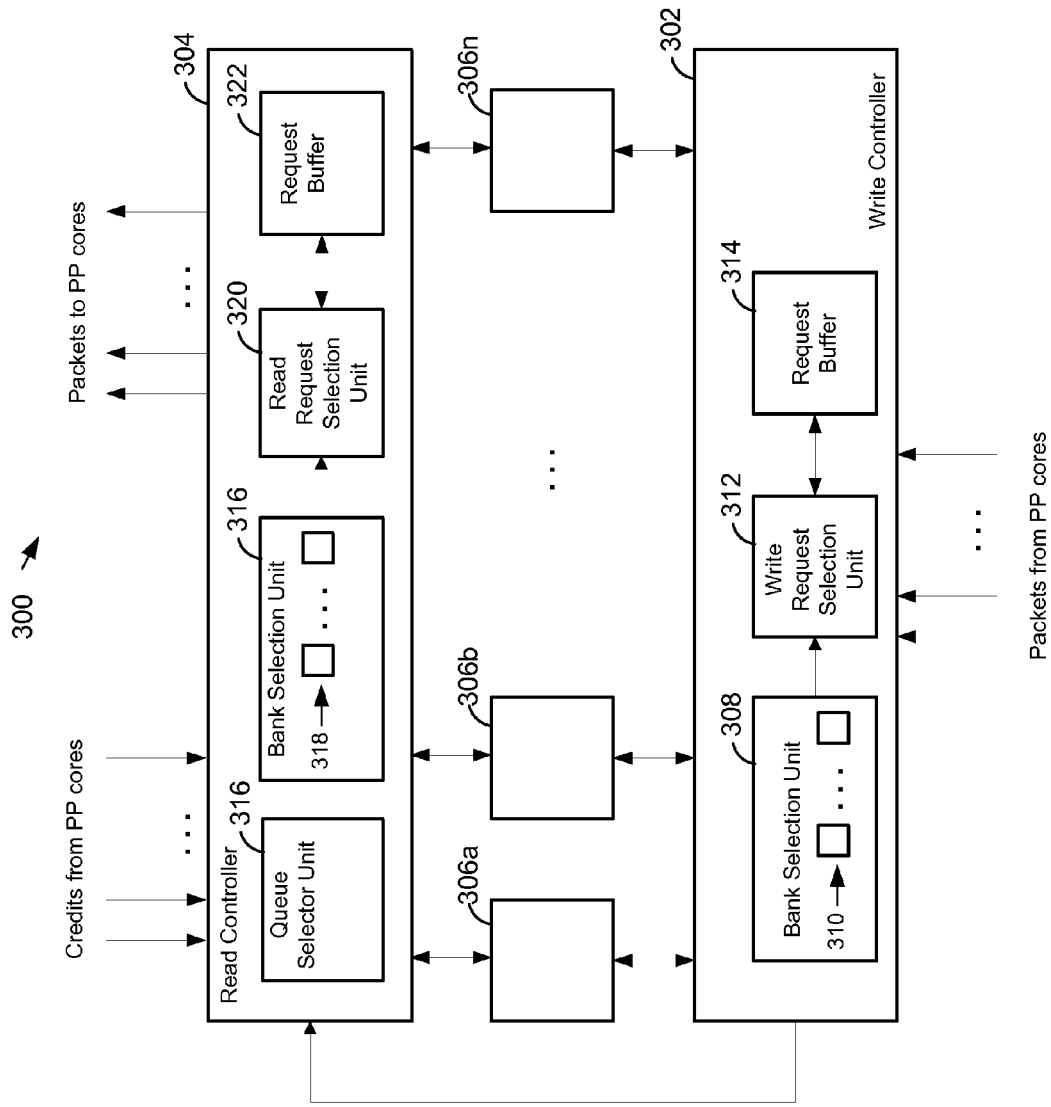
FIG. 3 is a block diagram of a egress queuing system that can be used in the network device of FIG. 1, according to another embodiment.

FIG. 3 is a block diagram of a egress queuing system 300, according to an embodiment. The egress queuing system 300 is used as the egress queuing system 104 of FIG. 1, in an embodiment. The egress queuing system 300 includes a write controller 302, a read controller 304 and a plurality of memory banks 306. The write controller 302 includes a bank selection unit 308 which, in turn, includes a plurality of pseudorandom number generators 310. Each pseudorandom number generator 310 is associated with a particular queue in the memory banks 306 and is used to distribute packets directed to the particular queue among the memory banks 306 as discussed above with respect to FIGS. 1 and 2. In addition, the write controller 302 includes a write request selection unit 312 coupled to a requests buffer 314. Generally speaking, the write request selection unit 312 operates to ensure that only one request for writing to a particular memory bank 306 is selected to be performed in a given clock cycle to avoid collisions in the memory banks 306 when multiple generated write requests correspond to a same memory bank 306, in an embodiment. In an embodiment, when the write controller 302 selects a memory bank 306 in which to store a packet, the write controller 302 generates a write request for writing the packet to the selected memory bank 306. In an embodiment, the write controller 302 concurrently generates multiple write requests corresponding to packets concurrently received by the egress queuing system 300 from multiple packet processing cores, in at least some situations.

In an embodiment, the write requests generated by the write controller 302 are provided to the write request selection unit 312. According to an embodiment, each write request includes an index indicating the order of the write request relative to other write requests generated by the write controller 302. To support multiple write requests that are concurrently generated by the write controller 302, the write controller 302 assigns respective indexes to the write requests generated by the write controller 302 in round robin order, in an embodiment. In an embodiment, the write request selection unit 312 stores the write requests provided to the write request selection unit 312 in the request buffer 314. In an embodiment, the write request selection unit 312 inserts write requests into the request buffer 314 in order, from oldest to newest, as indicated by the indexes assigned to the write requests. Accordingly, the write requests stored in the request buffer 314 are arranged according to respective ages of the write requests, from the oldest write request to the newest write request, in an embodiment.

The write request selection unit 312 is configured to select write requests from the request buffer 314 to be performed in a given clock cycle by the write controller 302 such that (i) only one of the selected write requests corresponds to a particular memory bank 306 and (ii) an oldest available write request is selected for a particular memory bank 306. In an embodiment, the write request selection unit 312 processes write requests in the request buffer 314 in the order of the write requests in the buffer 314 to select, for each of the memory banks 306, at most one write request corresponding to the memory bank 306. When multiple write requests in the request buffer 314 correspond to a particular memory bank 306, the write request selection unit 312 selects the first (i.e., the oldest) one of the multiple write requests that correspond to the particular memory bank 306, in an embodiment.

The write request selection unit 312 provides the selected write requests to the write controller 302 and removes the selected write requests from the buffer 314, in an embodiment. The write controller 304 performs the selected write requests in the memory banks 306. Because a single write request is selected for each of the memory banks 306, the write controller 304 is able to write the corresponding packets in a single clock cycle, in parallel, to the memory banks 306, in an embodiment. The write request selection unit 312 rearranges the requests remaining in the buffer 314, and any newly inserted requests in the buffer 314, according to the order of the requests in the buffer 314 and repeats the selection process as described above to select write requests to be performed in a next clock cycle, in an embodiment.

The read controller 304 is generally similar to the read controller 106 of FIG. 1 and/or the read controller 204 of FIG. 2. The read controller 304 includes a bank selection unit 316 which, in turn, includes a plurality of pseudorandom number generators 318. Each pseudorandom number generator 318 is associated with a particular queue in the memory banks 306 and is used to retrieve packet from the particular queue in the memory banks 306 as discussed above with respect to FIGS. 1 and 2. In addition, the read controller 304 includes a read request selection unit 320 coupled to a request buffer 322. Generally speaking, the read request selection unit 320 operates in a manner similar to the write request selection unit 312 to ensure that only one request for reading from a particular memory bank 306 is selected to be performed in a given clock cycle to avoid collisions in the memory banks 306 when multiple generated read requests correspond to a same memory bank 306, in an embodiment. In an embodiment, when the read controller 304 selects a memory bank 306 from which to retrieve a packet, the read controller 304 generates a read request for reading the packet from the selected memory bank 306. In an embodiment, the read controller 304 concurrently generates multiple read requests corresponding to packets to be retrieved from the memory banks 306, in at least some situations.

In an embodiment, the read requests generated by the read controller 304 are provided to the read request selection unit 320. In an embodiment, each read request includes an index indicating the order of the read request relative to other read requests generated by the read controller 304. To support multiple read requests that are concurrently generated by the read controller 304, the read controller 304 assigns respective indexes to the read requests generated by the read controller 304 in round robin order, in an embodiment. In an embodiment, the read request selection unit 320 stores the read requests provided to the read request selection unit 320 in the request buffer 322. In an embodiment, the read request selection unit 320 inserts read requests into the request buffer 322 in order, from oldest to newest, as indicated by the indexes assigned to the read requests. Accordingly, the read requests stored in the request buffer 322 are arranged according to respective ages of the read requests, from the oldest read request to the newest read request, in an embodiment.

The read request selection unit 320 is configured to select read requests from the request buffer 322 to be performed in a given clock cycle by the read controller 304 such that (i) only one of the selected read requests corresponds to a particular memory bank 306 and (ii) an oldest available write request is selected for a particular memory bank 306. In an embodiment, the read request selection unit 320 processes read requests in the request buffer 322 in the order of the read requests in the buffer 322 to select, for each of the memory banks 306, at most one read request corresponding to the memory bank 306. When multiple read requests in the request buffer 322 correspond to a particular memory bank 306, the read request selection unit 320 selects the first (i.e., the oldest) one of the multiple read requests that correspond to the particular memory bank 306, in an embodiment.

The read request selection unit 320 provides the selected read requests to the read controller 304 and removes the selected read requests from the buffer 322, in an embodiment. The read controller 304 performs the selected read requests in the memory banks 306. Because a single read request is selected for each of the memory banks 306, the read controller 304 is able to retrieve the corresponding packets in a single clock cycle, in parallel, from the memory banks 306, in an embodiment. The read request selection unit 320 rearranges the requests remaining in the buffer 322, and any newly inserted requests in the buffer 322, according to the order of the requests in the buffer 322 and repeats the selection process as described above to select read requests to be performed in a next clock cycle, in an embodiment.

In an example embodiment, the write request selection unit 312 and the read request selection unit 320 each operates as described by the pseudo code below.

function [numOfUpdates]=RequestMatch(banksReqMatrix, numOfBanks, reOrderBufSize, numOfClients, numOfHierarchies)
% Function inputs is banks request matrix per client where the columns are
% client and row are banks requests where 0 stands for null request each
% request is associate with index to enable re-order.
% Output is vector of request index per client
numOfUpdates=0;
% algorithm description:
% Each client generate requests to bank each iteration.
% The arbiter holds all pending for each bank in request time order.
% Arbiter perform matching between the oldest request to the free banks.

```
persistent pendingReqBuf;
if(isempty(pendingReqBuf))
   pendingReqBuf = zeros(reOrderBufSize,numOfHierarchies);
end
% inserting new requests to the pending request buffer
for i = 1 : reOrderBufSize
   if(pendingReqBuf(i,1) == 0)
      for c = 1 : numOfClients
         if(banksReqMatrix(c,1) > 0)
            pendingReqBuf(i+c-1,:) = banksReqMatrix(c,:);
            if(i+c-1>reOrderBufSize)
               str = sprintf('ERROR in insertion loop,
               entry=%d, client=%d',i+c-1,c);
               disp(str);
            end
         end
      end
      break;
   end
end
% matching request to banks
   servedBanks = zeros(numOfBanks,numOfHierarchies,'uint32');
   for i =1 : reOrderBufSize
      if(pendingReqBuf(i,l) == 0)
         break;
      end
      busy = 0;
      for j = 1 : numOfHierarchies
         if(servedBanks(pendingReqBuf(i,j),j) == 1)
            busy = 1;
            break;
         end
      end
      if(busy == 0)
         for j = 1 : numOfHierarchies
            servedBanks(pendingReqBuf(i,j),j) = 1;
            pendingReqBuf(i,j) = 0;
         end
         numOfUpdates = numOfUpdates + 1;
      end
   end
% rearranging pending request buffer
   for i = 1 : reOrderBufSize-1
      if(pendingReqBuf(i,l) == 0)
         for j = i+1 : reOrderBufSize
            if(pendingReqBuf(j ,1) ~= 0)
               pendingReqBuf(i,:) = pendingReqBuf(j,:);
               pendingReqBuf(j,:) = zeros( 1,numOfHierarchies,'uint32');
               break;
            end
         end
      end
   end
```

With continued reference to FIG. 3, the read controller 304 also includes a queue selector unit 324 configured to select a next queue that the read controller 304 should dequeue from the memory banks 306. According to an embodiment, the memory banks 306 include a set of one or more queues configured as regular or "credit" queues and a set of one or more queues configured as low latency queues. The queue selector unit 324 is configured to treat the regular queues differently from the low latency queues when determining which queue to dequeue from the memory banks 306, in an embodiment. Generally speaking, the queue selector unit 324 selects queues to dequeue from a set of queues eligible to be de-queued, in an embodiment. For example, in an embodiment, the queue selector unit 324 maintains a set of counters corresponding to the regular queues and a set of counters corresponding to the low latency queues. The queue selector unit 324 receives, from packet processing cores that are to transmit packets corresponding to regular queues, credits corresponding to the regular queues. A credit corresponding to a regular queue indicates a number of bytes to be credited to the queue, in an embodiment. When the queue selector unit 324 receives a credit corresponding to a regular queue, the queue selector unit 324 increments the counter associated with the regular queue by the number of bytes to be credited to the queue indicated by the credit received for the regular queue.

In an embodiment, when the queue selector unit 324 selects a regular queue to be de-queued, the read controller 324 determines a number of packets that should be dequeued from the queue based on the credits received for the queue. The read controller 304 then dequeues the determined number of packets from the queue, and the queue selection unit 324 decrements the counter associated with the queue by the number of bytes de-queued from the queue. In general, a regular queue is eligible to be selected for dequeuing when the counter associated with the queue has a positive value, in an embodiment. Conversely, a regular queue is not eligible to be selected for dequeuing when the counter associated with the queue has a negative value, in an embodiment.

Similarly, a positive value of a counter associated with a low latency queue indicates that the low latency queue is eligible to be selected for dequeuing, in an embodiment. However, counters associated with low latency queues are updated in a manner different from counter associated with regular queues, in an embodiment. For example, the queue selector unit 324 increments a counter associated with a low latency queue (e.g., by a value of one) each time a packet is enqueued in the low latency queue. For example, when the write controller 302 enqueues a packet in a low latency queue, the write controller 302 sends an update corresponding to the low latency queue to the read controller 304. The update indicates to the read controller 304 that a packet has been enqueued in the low latency queue. In response to receiving the update, the queue selector unit 324 increments (e.g., by a value of one) the counter associated with the low latency queue. The queue selector unit 324 decrements a counter associated with a low latency queue each time a packet is dequeued from the low latency queue, in an embodiment. A value of zero of a counter associated with a low latency queue indicates that the low latency queue is not eligible to be selected for dequeuing, in an embodiment.

In an embodiment, the queue selector unit 324 implements round robin selection among eligible regular queues, and round robin selection among low latency queues. In an embodiment, the queue selector unit 324 gives strict priority to low latency queues. That is, when one or more of the low latency queues are eligible to be selected for dequeuing, queue selector unit 324 selects among the one or more eligible low latency queues, in this embodiment. The queue selector unit 324 selects among eligible regular queues only when there are no eligible low latency queues, in this embodiment.

In some embodiments, in addition to counters associated with regular queues, the read controller 304 includes a respective total credit counter associated with each of the packet processing cores serviced by the egress queuing system 300. A total credit counter associated with a packet processing core is incremented based on total number of bytes corresponding to all credits received from the packet processing core and is decremented by the total number of bytes dequeued from the queues associated with the packet processing core, in an embodiment. The read controller 304 utilizes a total credit counter associated with a packet processing core to determine whether a back pressure indication should be sent to the packet processing core. For example, when a value of a total credit counter associated with a packet processing core exceeds a certain overflow threshold, the read controller 304 sends a back pressure indication to the packet processing core. For example, the read controller 304 asserts a backpressure signal coupled to the packet processing core. In an embodiment, the packet processing core utilizes the backpressure indication to implement flow control. For example, in response to receiving backpressure indication from the queuing system 300, such as when the backpressure signal to the packet processing core is asserted by the egress queuing system 300 the packet processing core temporarily stops generating credits for the queues associated with the packet processing core, in an embodiment. Subsequently (e.g., after a certain period of time), the egress queuing system 300 stops sending the backpressure indication to the packet processing core, for example by deasserting the backpressure signal coupled to the packet processing core, in an embodiment. The packet processing core then again begins generating credits for the queues associated with the packet processing core and provided the credits to the egress queuing system 300, in an embodiment.

Figure 4:
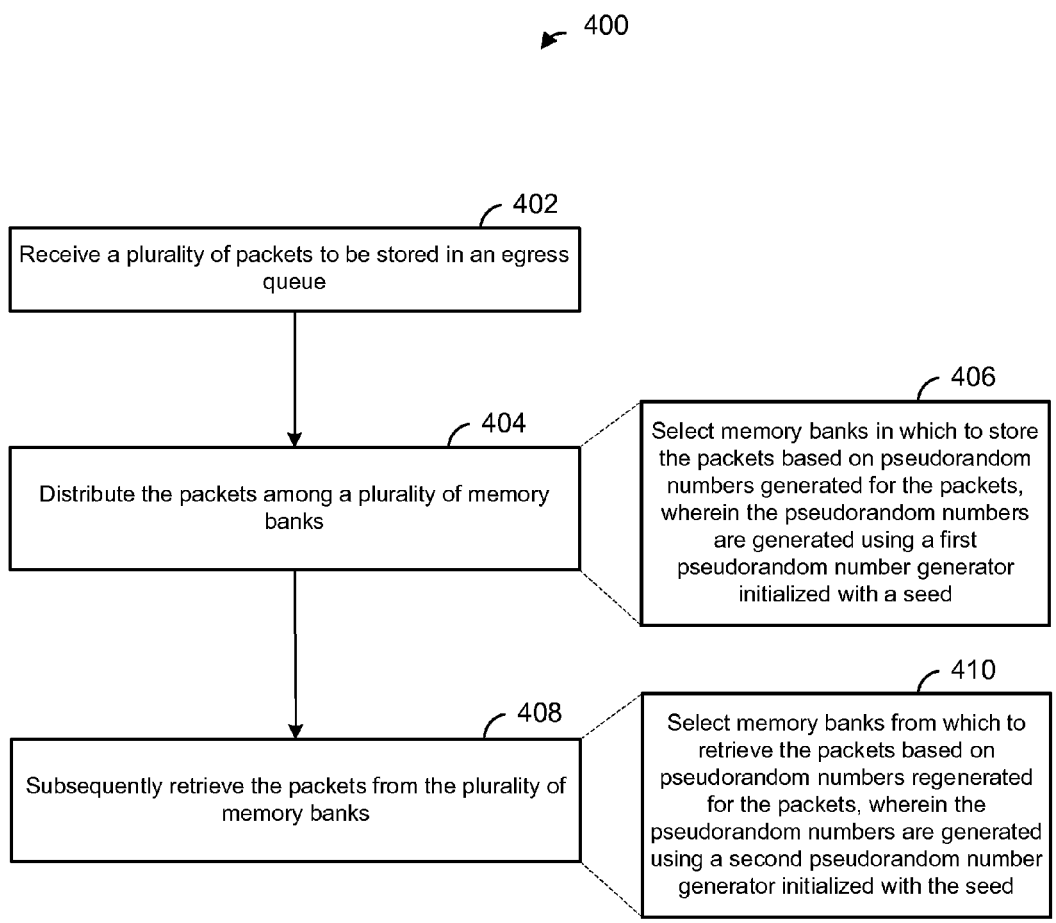
FIG. 4 is a flow diagram of a method of managing queues in an egress queuing system in a network device, according to an embodiment.

FIG. 4 is a method 400 of managing egress queues in an egress queuing system in a network device, according to an embodiment. In an embodiment, the method 400 is implemented by the network device 100 of FIG. 1. For example, the method 400 is implemented by the egress queuing system 104 of FIG. 1, in an embodiment. In another embodiment, the method 400 is implemented by the egress queuing system 200 of FIG. 2 or the egress queuing system 400 of FIG. 3. In other embodiments, the method 400 is implemented by other suitable queuing systems and/or queuing systems in other suitable network devices. For ease of explanation, the method 400 is described below in connection with the network device 100 of FIG. 1.

At block 402, a plurality of packets to be stored in an egress queue are received. In an embodiment, the plurality of packets are received by the egress queuing system 104. For example, the plurality of packets are received by the write controller 106, in an embodiment. In an embodiment, the plurality of packets are received from one or more of the packet processing cores 102.

At block 404, the packets received at block 402 are distributed among a plurality of memory banks, wherein the memory banks are configured to store the packets directed to the queue. In an embodiment, the write controller 104 distributes the packets among the plurality of memory banks 110. Block 404 includes block 406. At block 406, memory banks in which to store the packets are selected. In an embodiment, the memory banks are selected at block 406 based on pseudorandom numbers generated for the packet to be stored in the queue. The pseudorandom numbers are generated using a first pseudorandom number generator associated with the egress queue, in an embodiment. The first pseudorandom number generator is initialized with a seed associated with the egress queue, in an embodiment. In an embodiment, the first pseudorandom number generator is one of the pseudorandom number generator 118. In another embodiment, the first pseudorandom number generator is another suitable pseudorandom number generator.

At block 408, the packets distributed among the plurality of memory banks at block 404 are retrieved from the plurality of memory banks. In an embodiment, the read controller 108 retrieves the packets from the plurality of memory banks 110. In an embodiment, when retrieving the packets from the queue, the read controller 108 selects, for each packet, a memory bank from which to retrieve the packet, and retrieves the packet from the selected memory bank. Block 408 includes block 410. At block 410, memory banks from which to retrieve the packets are selected. In an embodiment, the memory banks are selected at block 410 based on pseudorandom numbers regenerated for the packet. The pseudorandom numbers are regenerated using a second pseudorandom number generator associated with the egress queue, in an embodiment. The second pseudorandom number generator is initialized with the same seed as the first pseudorandom number generator used for distributing the packets among the plurality of memory banks a block 406. In an embodiment, the second pseudorandom number generator is one of the pseudorandom number generator 120 of the read controller 106. In another embodiment, the second pseudorandom number generator is another suitable pseudorandom number generator.

In an embodiment, each of the plurality of memory banks maintains a local queue corresponding to the egress queue in which the packets received at block 402 are to be stored. In this embodiment, distributing the packets among the plurality of memory banks includes writing the packets to respective tails of the local queues in the memory banks selecting for storing the packets based on the pseudorandom number generated for the packets at block 406. Further, retrieving the packets from the plurality of memory banks includes retrieving the packets from heads of the local queues in the memory banks selected for retrieving the packets based on the pseudorandom numbers regenerated for the packets at block 410, in this embodiment. Because the pseudorandom numbers generated for the packets at block 406 and the pseudorandom number regenerated for the packets at block 410 are generated using pseudorandom number generators initialized with a same seed, the memory banks selected for retrieving the packets at block 410 correspond to the memory banks selected for storing the packets at block 406. Further, because the order of packets in the egress queue in each memory bank is locally maintained within the memory bank, the overall order of the packets within the egress queue is preserved when the packets are retrieved from the egress queue, in an embodiment.

At least some of the various blocks, operations, and techniques described above may be implemented utilizing hardware, a processor executing firmware instructions, a processor executing software instructions, or any combination thereof. For example, at least some of the various blocks, operations, and techniques described above may be implemented in a custom integrated circuit (IC), an application specific IC (ASIC), a programmable logic device, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of managing queues in an egress queuing system in a network device, the method comprising:
receiving a plurality of packets to be stored in a first egress queue, wherein the first egress queue is distributed among a plurality of memory banks;
distributing the packets among the plurality of memory banks, including selecting memory banks in which to store the packets based on pseudorandom numbers generated for the packets, wherein the pseudorandom numbers are generated using a first pseudorandom number generator initialized with a first seed; and
subsequently retrieving the packets from the plurality of memory banks, including selecting memory banks from which to retrieve the packets based on pseudorandom numbers regenerated for the packets, wherein the pseudorandom numbers are regenerated using a second pseudorandom number generator initialized with the first seed.

2. The method of claim 1, wherein each memory bank among the plurality of memory banks includes a local queue corresponding to the first egress queue, and wherein writing a packet to a selected memory bank comprises writing the packet to a head of the local queue in the selected memory bank.

3. The method of claim 2, wherein retrieving a packet from a selected memory bank comprises retrieving the packet from a tail of the local queue in the selected memory bank.

4. The method of claim 1, wherein distributing the plurality of packets, to be stored in the first queue, among the plurality of memory banks configured to store the first queue, includes writing, in a same clock cycle, multiple packets to the first queue in multiple memory banks configured to store the first queue, wherein each packet of the multiple packets is written to a respective memory bank selected for storing the packet such that respective packets among the multiple packets to be stored in the first queue are written, in the same clock cycle, to different ones of the memory banks among the plurality of memory banks configured to store the first queue.

5. The method of claim 1, wherein retrieving the packets from the first queue includes retrieving, in a same clock cycle, multiple packets from the first queue in multiple memory banks configured to store the first queue, wherein each packet of the multiple packets is retrieved from a respective memory bank selected for retrieving the packet such that respective packets among the multiple packets are retrieved, in the same clock cycle, from different ones of the memory banks configured to store the first queue.

6. The method of claim 1, wherein the plurality of packets is a first plurality of packets, the method further comprising:
receiving a second plurality of packets to be stored in a second queue, wherein the second egress queue is distributed among the plurality of memory banks;
distributing the second plurality of packets among the plurality of memory banks, including selecting memory banks in which to store the packets based on pseudorandom numbers generated for the packets, wherein the pseudorandom numbers are generated using a third pseudorandom number generator initialized with a second seed, the second seed associated with the second queue; and
subsequently retrieving the second plurality of packets from the plurality of memory banks, including selecting memory banks from which to retrieve the packets based on pseudorandom numbers regenerated for the packets, wherein the pseudorandom numbers are regenerated using a fourth pseudorandom number generator initialized with the second seed associated with the second queue.

7. The method of claim 6, wherein each memory bank supports a single write operation in a same clock cycle, and wherein the method further comprises:
storing write requests corresponding to packets to be written to the memory banks, wherein each write request is associated with the selected memory bank in which to store the corresponding packet; and
when multiple ones of the stored write requests are associated with a same memory bank, selecting a write request, from the multiple write requests, to be performed in the same memory bank in a given clock cycle, including selecting an oldest one of the multiple write requests in the list of write requests.

8. The method of claim 6, wherein each memory bank supports a single read operation in a same clock cycle, and wherein the method further comprises:
storing read requests corresponding to packets to be retrieved from the memory banks, wherein each read request is associated the selected memory bank from which to retrieve the corresponding packet; and
when multiple ones of the stored read requests are associated with a same memory bank, selecting a read request, from the multiple read requests, to be performed in the same memory bank in a given clock cycle, including selecting an oldest one of the multiple read requests in the list of read requests.

9. An egress queuing system, comprising:
a plurality of memory banks for storing egress queues, wherein each egress queue is distributed among two or more memory banks of the plurality of memory banks;
a write controller coupled to the plurality of memory banks, the write controller configured to
receive a plurality of packets to be stored in a first egress queue, and
distribute the packets among the plurality of memory banks configured to store the first queue, wherein the write controller is configured to select memory banks in which to store the packets based on pseudorandom numbers generated for the packets, wherein the pseudorandom numbers are generated using a first pseudorandom number generator initialized with a first seed; and
a read controller coupled to the plurality of memory banks, the read controller configured to retrieve the packets from the plurality of memory banks configured to store the first queue, wherein the read controller is configured to select memory banks from which to retrieve the packets based on pseudorandom numbers regenerated for the packets, wherein the pseudorandom numbers are regenerated using a second pseudorandom number generator initialized with the first seed.

10. The egress queuing system of claim 9, wherein each memory bank among the plurality of memory banks includes a local queue corresponding to the first egress queue, and wherein the write controller is configured to write a packet to a head of the local queue in a memory bank selected for storing the packet.

11. The egress queuing system of claim 10, wherein the read controller is configured to retrieve a packet from a tail of the local queue in a memory bank selected for retrieving the packet.

12. The egress queuing system of claim 9, wherein the write controller is configured to write, in a same clock cycle, multiple packets to the first queue in multiple memory banks configured to store the first queue, wherein each packet of the multiple packets is written to a respective memory bank selected for storing the packet, such that respective packets among the multiple packets to be stored in the first queue are written, in the same clock cycle, to different ones of the memory banks among the plurality of memory banks configured to store the first queue.

13. The egress queuing system of claim 9, wherein the read controller is configured to retrieve, in a same clock cycle, multiple packets from the first queue in multiple memory banks configured to store the first queue, wherein each packet of the multiple packets is retrieved from a respective memory bank selected for retrieving the packet, such that respective packets among the multiple packets are retrieved, in the same clock cycle, from different ones of the memory banks configured to store the first queue.

14. The egress queuing system of claim 9, wherein the plurality of packets is a first plurality of packets, and wherein:
the write controller is further configured to
receive a second plurality of packets to be stored in a second egress queue, and
distribute the packets among the plurality of memory banks, wherein the write controller is configured to select memory banks in which to store the packets based on pseudorandom numbers generated for the packets, wherein the pseudorandom numbers are generated using a third pseudorandom number generator initialized with a second seed; and
the read controller is further configured to retrieve the packets from the plurality of memory banks, wherein the read controller is configured to select memory banks from which to retrieve the packets based on pseudorandom numbers regenerated for the packets, wherein the pseudorandom numbers are regenerated using a fourth pseudorandom number generator initialized with the second seed.

15. The egress queuing system of claim 14, wherein each memory bank supports a single write operation in a same clock cycle, and wherein the write controller is further configured to
store write requests corresponding to packets to be written to the memory banks, wherein each write request is associated with the selected memory bank in which to store the corresponding packet; and
when multiple ones of the stored write requests are associated with a same memory bank, select a write request, from the multiple write requests, to be performed in the same memory bank in a given clock cycle, including selecting an oldest one of the multiple write requests in the list of write requests.

16. The egress queuing system of claim 14, wherein each memory bank supports a single read operation in a same clock cycle, and wherein the method further comprises:
storing read requests corresponding to packets to be retrieved from the memory banks, wherein each read request is associated the selected memory bank from which to retrieve the corresponding packet; and
when multiple ones of the stored read requests are associated with a same memory bank, selecting a read request, from the multiple read requests, to be performed in the same memory bank in a given clock cycle, including selecting an oldest one of the multiple read requests in the list of read requests.

17. A network device, comprising:
one or more packet processing cores configured to receive packets from a network and to transmit packets on a network; and
an egress queuing system coupled to the one or more packet processing cores, the egress queuing system configured to
receive, from one or more packet processing cores, a plurality of packets to be stored in a first egress queue, wherein the first queue is distributed among a plurality of memory banks, distribute the packets among the plurality of memory banks, wherein the egress queuing system is configured to select memory banks in which to store the packets based on pseudorandom numbers generated for the packets, wherein the pseudorandom numbers are generated using a first pseudorandom number generator initialized with a first seed; and
subsequently retrieve the packets from the plurality of memory banks, wherein the egress queuing system is configured to select memory banks from which to retrieve the packets based on pseudorandom numbers regenerated for the packets, wherein the pseudorandom numbers are regenerated using a second pseudorandom number generator initialized with the first seed.

18. The network device of claim 17, wherein each memory bank among the plurality of memory banks includes a local queue corresponding to the first egress queue, and wherein the egress queuing system is configured to write a packet to a head of the local queue in a memory bank selected for storing the packet, and to retrieve the packet from a tail of the local queue in the memory bank selected for retrieving the packet.

19. The network device of claim 17, wherein the egress queuing system is configured to write, in a same clock cycle, multiple packets to the first queue in multiple memory banks configured to store the first queue, wherein each packet of the multiple packets is written to a respective memory bank selected for storing the packet, such that respective packets among the multiple packets to be stored in the first queue are written, in the same clock cycle, to different ones of the memory banks among the plurality of memory banks configured to store the first queue.

20. The network device of claim 17, wherein the egress queuing system is configured to retrieve, in a same clock cycle, multiple packets from the first queue in multiple memory banks configured to store the first queue, wherein each packet of the multiple packets is retrieved from a respective memory bank selected for retrieving the packet, such that respective packets among the multiple packets are retrieved, in the same clock cycle, from different ones of the memory banks configured to store the first queue.

21. The network device of claim 17, wherein the plurality of packets is a first plurality of packets, and wherein the egress queuing system is further configured to
receive a second plurality of packets to be stored in a second egress queue,
distribute the packets among the plurality of memory banks, wherein the egress queuing system is configured to select memory banks in which to store the packets based on pseudorandom numbers generated for the packets, wherein the pseudorandom numbers are generated using a third pseudorandom number generator initialized with a second seed, and
subsequently retrieve the packets from the plurality of memory banks, wherein the egress queuing system is configured to select memory banks from which to retrieve the packets based on pseudorandom numbers regenerated for the packets, wherein the pseudorandom numbers are regenerated using a fourth pseudorandom number generator initialized with the second seed.

* * * * *